United States Patent
Sauer et al.

(10) Patent No.: US 7,369,101 B2
(45) Date of Patent: May 6, 2008

(54) CALIBRATING REAL AND VIRTUAL VIEWS

(75) Inventors: Frank Sauer, Princeton, NJ (US); Yakup Genc, Princeton, NJ (US); Nassir Navab, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 426 days.

(21) Appl. No.: 10/863,414

(22) Filed: Jun. 8, 2004

(65) Prior Publication Data
US 2006/0152434 A1    Jul. 13, 2006

(51) Int. Cl.
*G09G 5/00* (2006.01)
(52) U.S. Cl. .............................. 345/8; 345/7; 345/629; 359/630
(58) Field of Classification Search ................ 345/4–9, 345/419, 619, 629, 630; 359/629, 630, 632
See application file for complete search history.

(56) References Cited

U.S. PATENT DOCUMENTS

| | | |
|---|---|---|
| 4,281,241 A | 7/1981 | Knight et al. |
| 4,439,755 A | 3/1984 | LaRussa |
| 5,610,678 A | 3/1997 | Tsuboi et al. |
| 2002/0095265 A1 | 7/2002 | Satoh et al. |
| 2002/0105484 A1 | 8/2002 | Navab et al. |

FOREIGN PATENT DOCUMENTS

| | | |
|---|---|---|
| DE | 69407188 T2 | 7/1998 |
| EP | 0 827 337 A1 | 3/1998 |
| GB | 2 259 231 A | 8/1991 |
| WO | WO 99 38449 A1 | 8/1999 |
| WO | WO 01/78015 | 10/2001 |

OTHER PUBLICATIONS

International Search Report.

*Primary Examiner*—David L. Lewis
(74) *Attorney, Agent, or Firm*—Donald B. Paschburg; F. Chau & Associates, LLC

(57) ABSTRACT

A method for calibrating real and virtual views includes tracking a calibration screen, wherein a real reference point, generated by a real reference point generator, is projected on the calibration screen, aligning a view of a virtual reference point to a view of the real reference point in a display, wherein the real reference point generator and the display have a fixed relative position, determining a point correspondence between the virtual reference point and the real reference point, and determining one or more parameters for rendering a virtual object in the real scene.

16 Claims, 6 Drawing Sheets

CALIBRATING REAL AND VIRTUAL VIEWS

BACKGROUND OF THE INVENTION

1. Field of the Invention

The present invention relates to augmented reality, and more particularly to a system and method for augmented reality calibration of see-through head-mounted displays.

2. Discussion of Related Art

Augmented vision, also referred to as augmented reality or augmented reality vision, augments a user's view of the real world with superimposed computer generated graphical information. This information may be include, for example, a text label attached to some object in the scene, or a three-dimensional (3D) model of a patient's brain, derived from an MRI scan, and aligned to the real view of the person's head.

The user may observe the real world directly with his or her eyes, and the additional graphics information is blended in via a semi-transparent display located between the observer and the real scene. Such a display device can, for example, be an optical see-through head mounted display.

The display can also be opaque, like a computer screen or a non-see-through head mounted display. It then presents to the user the complete augmented view, a combination of the real-world view and the graphics overlay. A video camera takes the place of the real-world observer to capture the real world-view. Two cameras may be implemented for stereo vision. A computer may be used to combine the live video with the graphics augmentation. A display device of this kind is, for example, a video-see-through head-mounted display.

The graphics are positioned, oriented, and scaled, or even rendered in a perspective fashion for correct alignment with the real-world view. To achieve precise alignment of the real and virtual view, the graphics may be anchored to a real-world object. For this knowledge of the position and orientation of the user's viewpoint is needed with respect to this object, and the orientation of the object. Thus, the relationship between two coordinate systems needs to be defined, one attached to the user's head, the other attached to the object.

Tracking denotes the process of keeping track of this relationship. Commercial tracking systems are available based on optical, magnetic, ultrasound, and mechanical means.

Calibration is needed to achieve correct alignment between virtual graphics objects and real objects in the scene. Calibrating a video-see-through HMD can be done in an objective way, independent of a user, as real and virtual images are combined in the computer. In contrast, with an optical-see-through HMD the combination of the real and virtual images takes place finally in the user's eye, and the position of the user's eye behind the semi-transparent screen has critical influence on the alignment.

Different methods for calibrating an optical-see-through HMD are known as prior art. All known calibration methods require the user to align virtual structures with real reference structures. For example, in the SPAAM method the user is shown a sequence of fixed graphical markers on the display and moves the head to bring them into alignment with a reference marker in the real scene. This alignment is hampered by the user's head jitter. Due to head jitter the location of the real marker jitters, and it is not possible to precisely align virtual and real markers.

For augmented reality applications needing both precise measurements and comfortable use, such as in an operating room, no known system currently exists. Therefore, a need exists for a system and method for augmented reality calibration of see-through head-mounted displays.

SUMMARY OF THE INVENTION

An augmented reality system comprises a real reference generator for displaying a real reference on a calibration screen, an optical see-through display having a fixed position with respect to the real reference generator and a virtual reference generator for displaying a virtual reference on the optical see-through display. The augmented reality system further comprises an input device for aligning a view of the virtual reference with a view of the real reference through the optical see-through display, wherein the virtual reference is moved on the optical see-through display, and a processor for determining one or more parameters for rendering a virtual object as part of a real scene seen through the optical see-through display.

The augmented reality system comprises a tracking camera for tracking a pose of the calibration screen with respect to the real reference.

The augmented reality system comprises a tracking camera having a fixed position with respect to the real reference generator for capturing a view of the calibration screen. The augmented reality system further comprises a processor, wherein an optical marker configuration is fixed to the calibration screen and imaged by the tracking camera, wherein the processor determines a positional relationship between the calibration screen and a head-mounted display according to a position of the optical marker configuration in an image captured by the tracking camera, the head-mounted display comprising the real reference generator and optical see-through display.

The augmented reality system comprises at least one tracking camera for capturing a view of the calibration screen and a head-mounted display comprising the real reference generator and optical see-through display. The augmented reality system further comprises a processor, wherein an optical marker configuration is fixed to each of the calibration screen and the head-mounted display and tracked by the at least one tracking camera, wherein the processor determines a positional relationship between the calibration screen and the head-mounted display according to the positions of respective optical marker configurations in the view captured by the at least one tracking camera.

A system for calibrating real and virtual views comprises a real reference generator for displaying a real reference on a calibration screen, an optical display having a fixed position with respect to the real reference point generator and a virtual reference generator for generating a virtual reference in the optical display. The system further comprises an input device for aligning a view of the virtual reference with a view of the real reference, wherein the virtual reference is moved on the optical display with respect to the view of the real reference and a processor for determining one or more parameters for rendering a virtual object in a real scene seen in the optical display.

The system further comprising a camera capturing the view of the real reference, wherein the real reference is displayed in the optical display with the virtual reference superimposed thereon. The system comprises a tracking camera having a fixed position with respect to the real reference generator for capturing a view of the calibration screen and a processor, wherein an optical marker configuration is fixed to the calibration screen and tracked by the tracking camera, wherein the processor determines a positional relationship between the calibration screen and a head-mounted display according to the position of the optical marker configuration in the view captured by the tracking camera, the head-mounted display comprising the real reference generator and optical display.

The system comprises a tracking camera coupled to the real reference generator for capturing a view of the calibration screen. The system further comprises a processor, wherein an optical marker configuration is fixed to the calibration screen and tracked by the tracking camera, wherein the processor determines a positional relationship between the calibration screen and a head-mounted display according to the position of the optical marker configuration in the view captured by the tracking camera, the head-mounted display comprising the real reference generator and optical display.

The system comprises at least one tracking camera for capturing a view of the calibration screen and a head-mounted display comprising the real reference generator and optical display. The system further comprises a processor, wherein an optical marker configuration is fixed to each of the calibration screen and the head-mounted display and tracked by the tracking camera, wherein the processor determines a positional relationship between the calibration screen and the head-mounted display according to the positions of respective optical marker configurations in the view captured by the at least one tracking camera.

A method for calibrating real and virtual views comprises tracking a calibration screen, wherein a real reference, generated by a real reference generator, is projected on the calibration screen, aligning a virtual reference to a view of the real reference in a display, wherein the real reference generator and the display have a fixed relative position, determining a point correspondence between the virtual reference and the real reference, and determining one or more parameters for rendering a virtual object in the real scene.

The method comprises displaying the virtual reference on an optical see-through display, through which the real reference is visible.

The method comprises capturing a view of a real scene including the real reference and displaying the view of the real scene augmented with the virtual reference.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

A system and method for calibration of an optical see-through head-mounted display (HMD) implements a real reference as a light spot originating from an illuminator attached to the HMD. The light spots "jitter along" with the HMD, and the user does not perceive any jitter between these reference markers and virtual markers that are displayed at a fixed location on a semi-transparent screen of the HMD.

Figure 1:
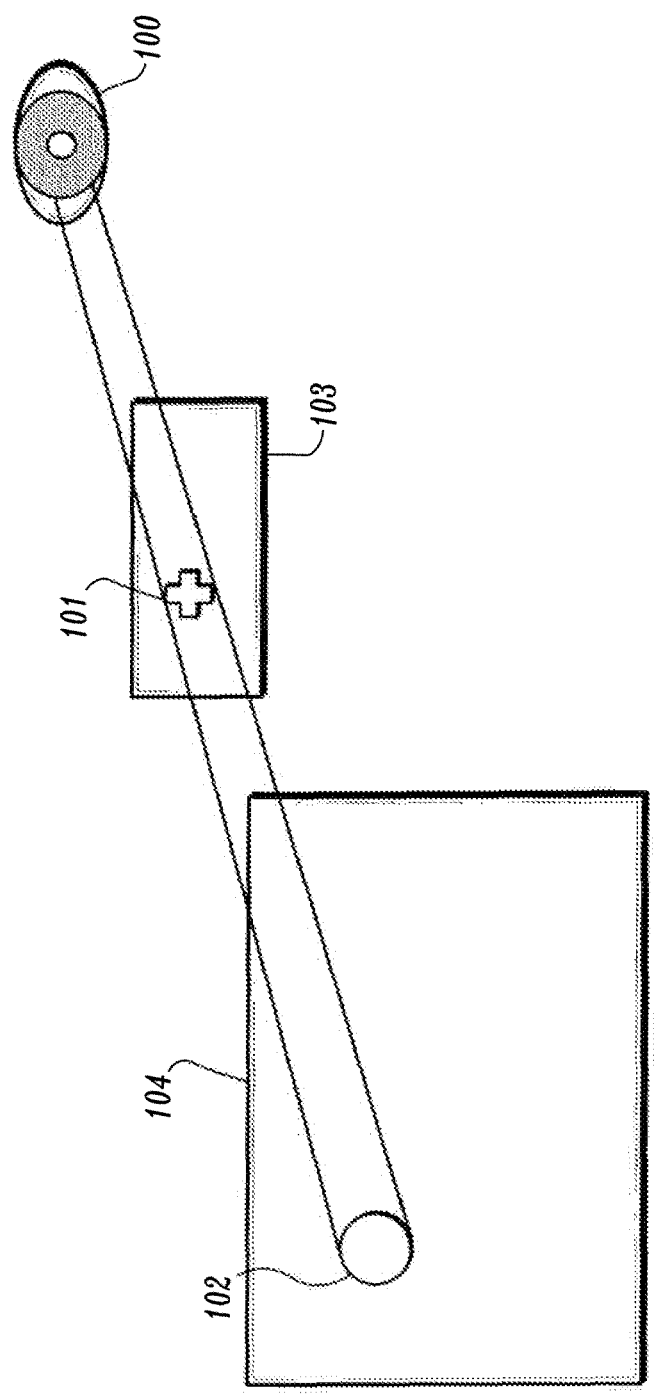
FIG. 1 is an illustration of a calibration system according to an embodiment of the present disclosure.

Referring to FIG. 1, to calibrate an optical see-through system, a user 100 aligns a virtual reference 101, displayed as graphics on the HMD's semitransparent screen 103, with a real reference structure 102, observed through the screen 103. The real reference structure 102 is implemented as a projected light point and/or pattern on a calibration screen 104 or other substrate. The real reference 102 and the virtual reference 101 may be, for example, one or more points or shapes.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 2A:
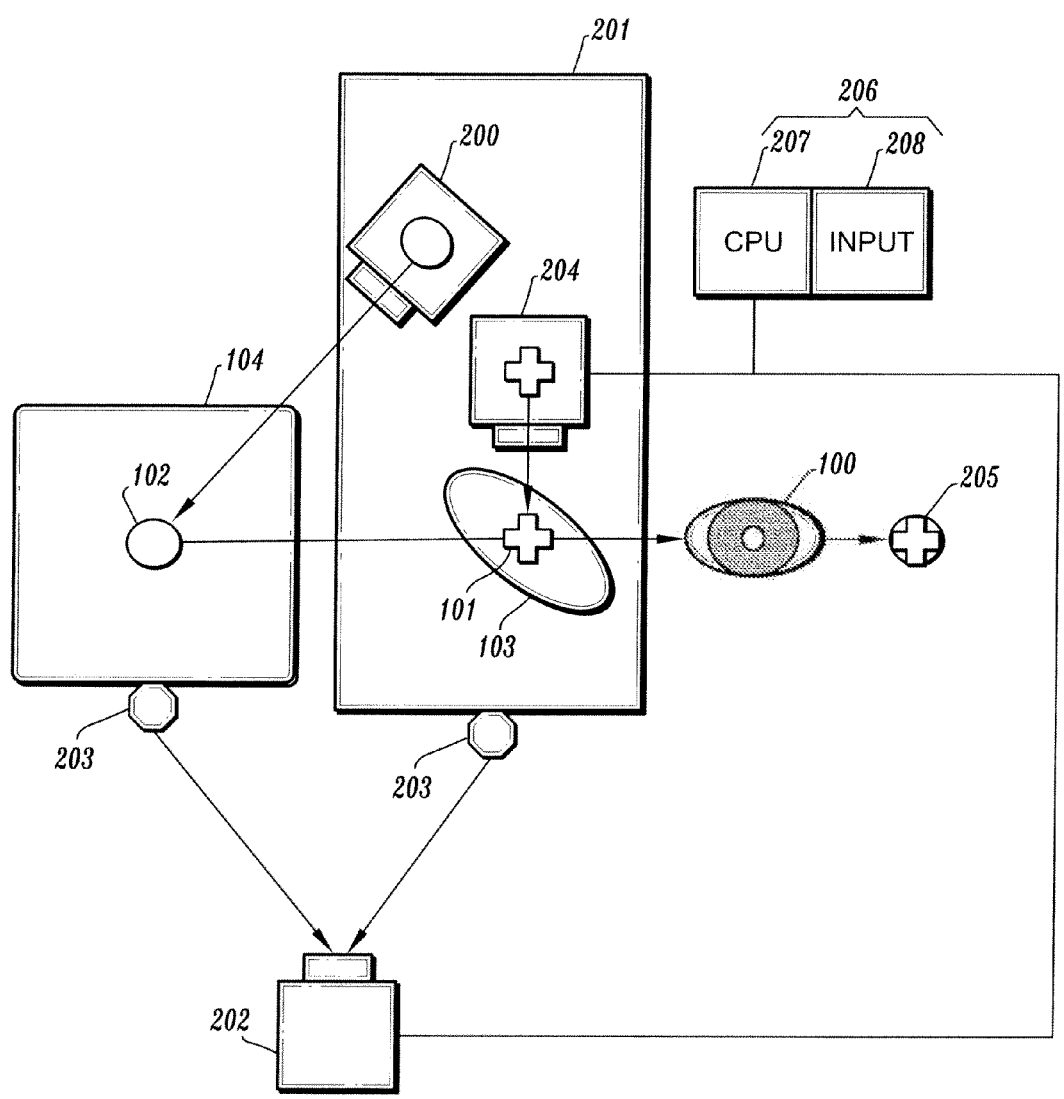
FIG. 2A is an illustration of an augmented reality calibration system according to an embodiment of the present disclosure.
Figure 2B:
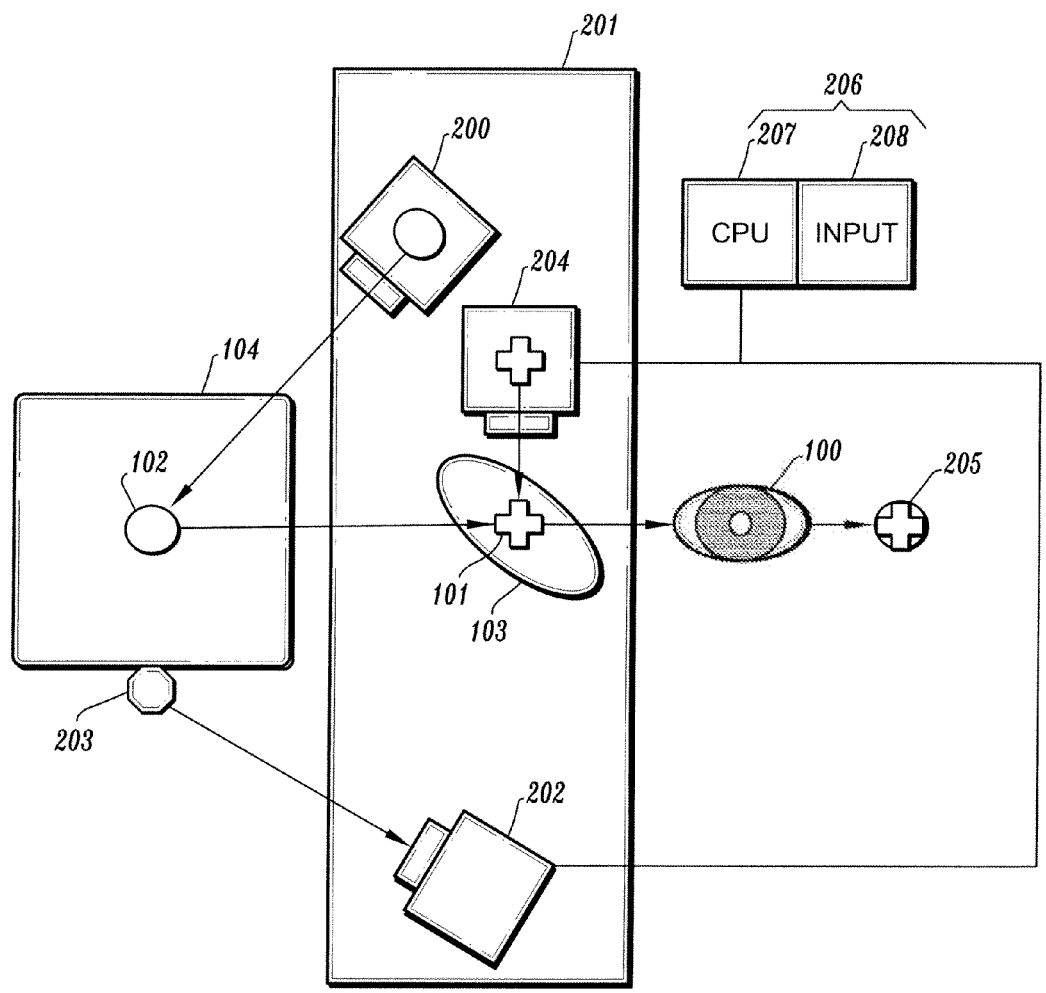
FIG. 2B is an illustration of an augmented reality calibration system according to an embodiment of the present disclosure.

Referring to FIGS. 2A and 2B, the real reference 102 originates from an illumination system 200 that is rigidly attached to the HMD 201 and observed through a screen 103. When the user moves the HMD 201, the real reference 102 moves along on the calibration screen 104, and for small head movements the real reference 102 appears fixed with respect to the virtual reference 101 as seen through the HMD's semi-transparent screen 103. An alignment process is now easier from a user's 100 vantage, as jitter between the real reference 102 and the virtual reference 101 is substantially reduced.

The real reference 102 is observed on a flat screen 104. The user can hold the screen 104 in one hand at arm's length, place it on a table, etc.

The screen 104 is tracked with respect to the user's head or HMD 201. A tracking arrangement includes an external (see FIG. 2A) or head-mounted (see FIG. 2B) tracking camera 202. In case of optical tracking, the screen 104 and—in the case of FIG. 2A's external tracking camera—the HMD 201 include optical markers 203. The optical markers 203 may be, for example, retroreflective flat discs, or retroreflective spheres.

The illuminator 200 projects a light pattern 102 that includes one, or preferably several points. The illuminator 200 can be constructed with a single light source and an optical system that generates the light pattern 102. For example, a laser could be used together with a lens system and a mask, or with diffractive optics to generate an array of light spots.

Alternatively, an array of light sources such as an LED array may be used with the advantage that the light pattern can be made switchable. The LEDs can be switched on and off individually. The LEDs can be combined with a lens system or with micro-optics, e.g. a lens array.

The illuminator 200 can also include a scanning means or beam deflection means to switch between different beam directions.

The screen 103 may be, for example, a monocular or binocular arrangement. In the binocular arrangement, both screens are preferably individually calibrated, one after the other. Appropriate optics 204 in combination with the semi-transparent display 103 generates an image of the virtual reference 101. The virtual reference 101 is visible to a user as the user looks through the semi-transparent display 103. Alternatively, the see-through display can be embodied with an image projector and an optical system, which includes a beam splitter.

To perform the calibration, the user 100 moves the virtual reference(s) 101 displayed on the semi-transparent screen 103 into alignment with the reference light pattern 102 as seen from the user's perspective, e.g., 205. The user 101 controls an interface 206 (e.g., processor 207 and input device 208) to move the virtual reference(s) 101 on the screen 103. The input device 208 may be, for example, a trackball or a mouse. The processor 207 may be a virtual reference generator comprising a processor and graphics card to render the virtual reference for display on the semi-transparent screen.

To complete the calibration process, the user aligns the virtual reference 101 to several different real reference light points, e.g., 102. For better calibration accuracy, the user may assume different poses (e.g., distances and/or orientations) with regard to the calibration screen 104.

A processor, e.g., 207, determines a spatial relationship between the calibration screen 104 and HMD 201 according to the positions of markers 203 and the user determined alignment of the virtual reference 101 and the real reference 102. FIG. 2B is an example of a HMD including a tracking camera 202. As shown, where the tracking camera is fixed to the HMD, the spatial relationship between the calibration screen 104 and HMD 201 may be determined using optical markers 203 fixed to the calibration screen 104 only. Further, the pose of the calibration screen 104 may be determined according to the relationship of different optical markers 203 fixed to the screen 104.

Figure 2C:
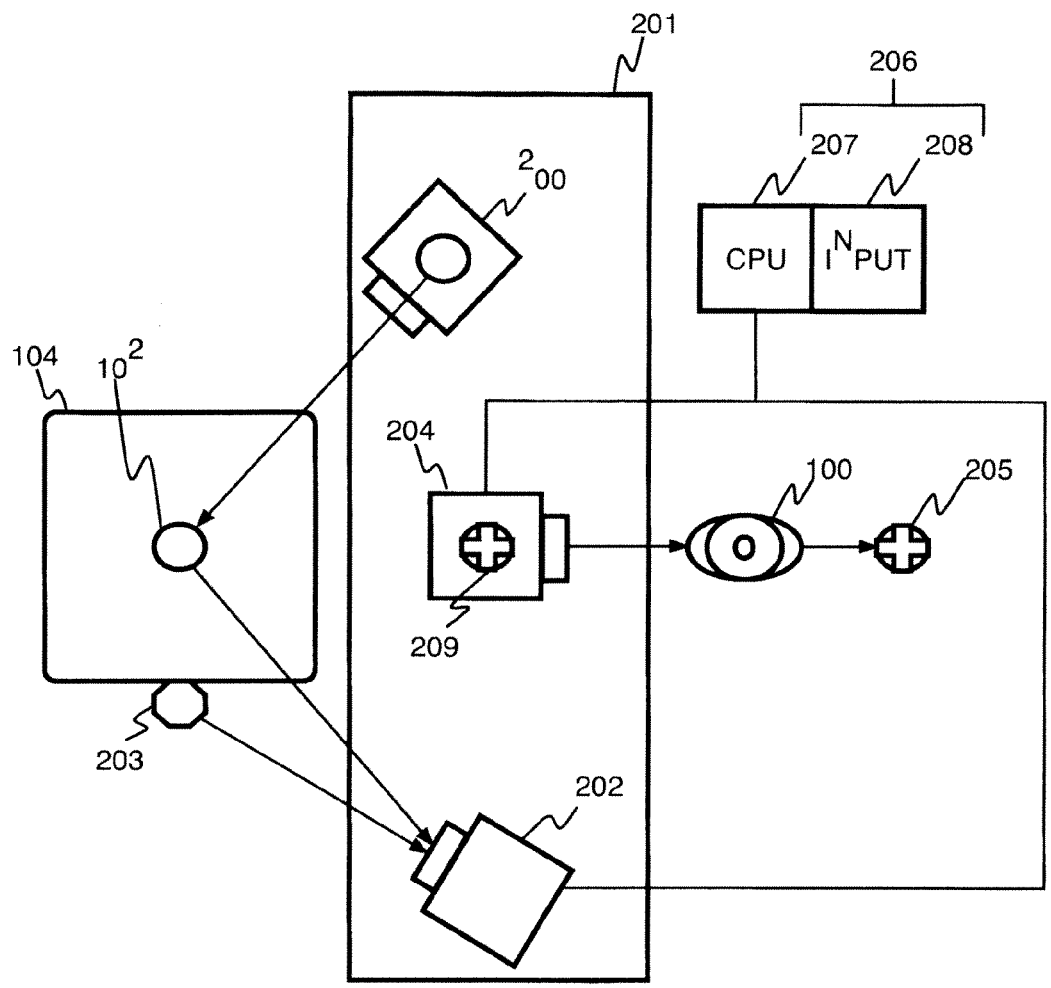
FIG. 2C is an illustration of a video-see-through augmented reality calibration system according to an embodiment of the present disclosure.

FIG. 2C is a video-see-through augmented reality system according to an embodiment of the present disclosure, wherein a camera, e.g., 202, captures an image of a real scene including a real reference 102. The tracking and video functions of camera 202 may be performed by separate cameras. The image of the real scene is displayed to the user 100. A virtual view is superimposed on the real view, e.g., 209, and the user 100 perceives real and virtual views, e.g., 204. The user may align the virtual reference with the view of the real reference in the real scene.

Figure 3:
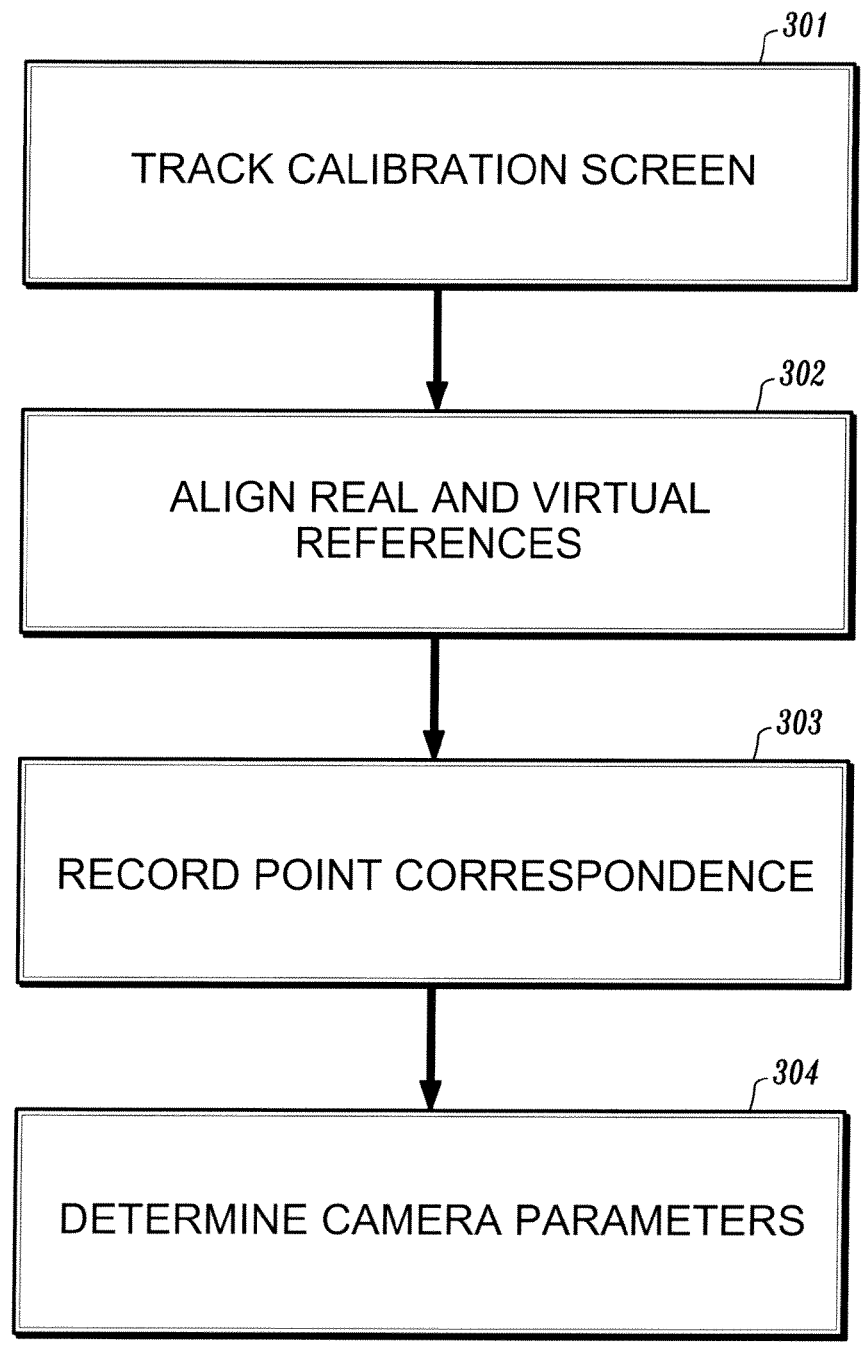
FIG. 3 is a flow chart of a method according to an embodiment of the present disclosure.
Figure 4:
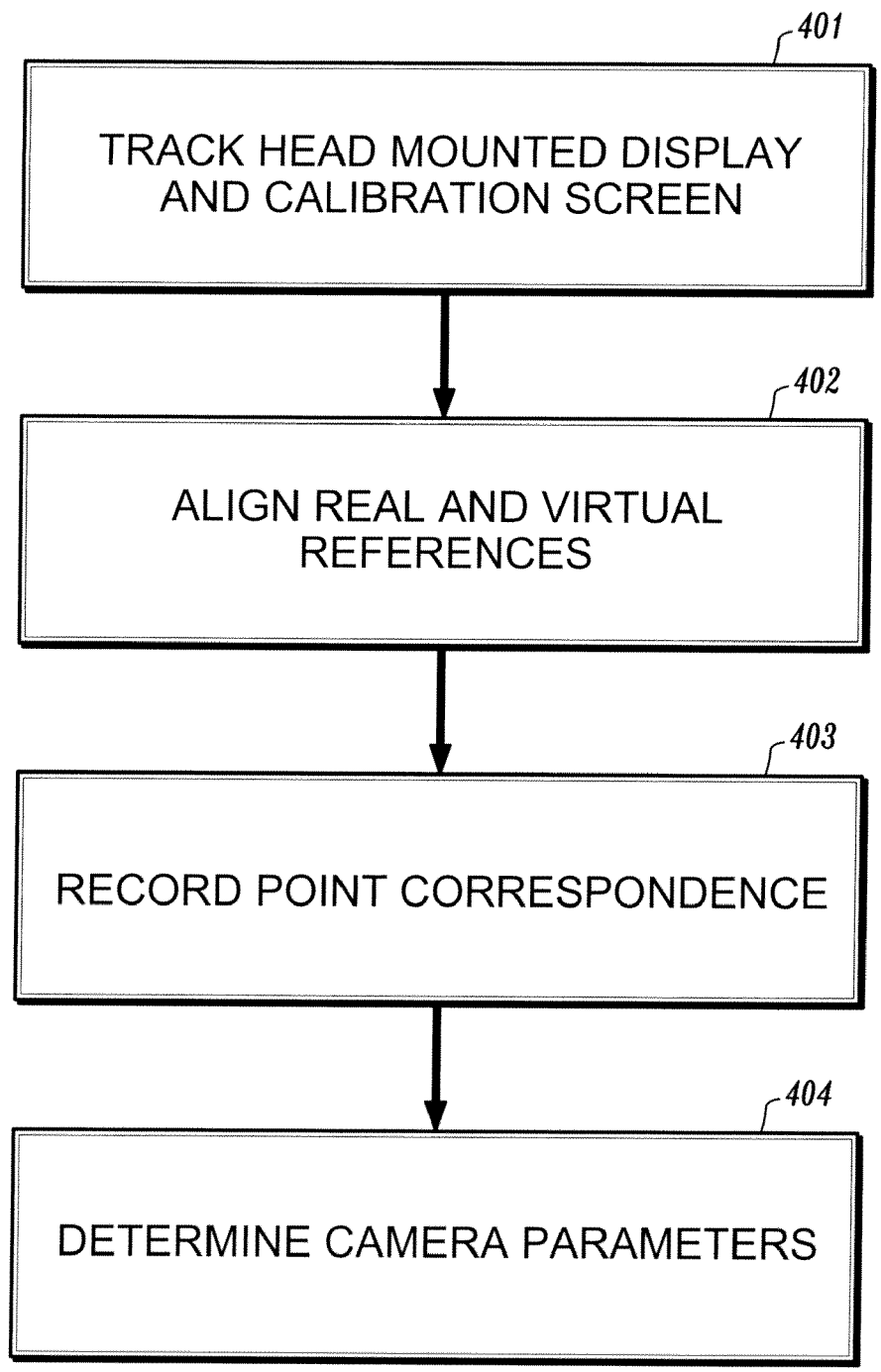
FIG. 4 is a flow chart of a method according to an embodiment of the present disclosure.

Referring to FIG. 3, consider the case of a head-mounted tracking camera. Tracking camera and illuminator are mechanically fixed to each other, and location and orientation of the light beams, which generate the reference points, are determined with respect to a coordinate system of the tracking camera. By tracking the calibration screen 301, one can determine the 3D coordinates of the reference points in the tracking camera coordinate system as the intersection of the corresponding light beams with the plane of the screen.

During the calibration process a user aligns the real and virtual references 302 and the system records a set of 3D-2D point correspondences 303. Each consists of the 3D coordinates of a reference light point and the 2D coordinates of a virtual marker that the user has aligned to the reference. This set of point correspondences allows one to determine one or more parameters for rendering the virtual objects in correct alignment with the real scene 304. For example, the camera parameters, that determine the user's view of the virtual world as displayed on the semitransparent screen, are matched to the camera parameters that determine the user's view of the real world as seen through the screen. Such determinations are known in the art, for example, as described in U.S. Patent Application No. 20020105484, filed Sep. 25, 2001, entitled "System and Method for Calibrating a Monocular Optical See-Through Head-Mounted Display System for Augmented Reality", wherein calibration may include instantiating parameter values for mathematical models that map the physical environment to internal representations, so that the computer's internal model matches the physical environment. These parameters include, for example, optical characteristics of a physical camera and position and orientation (pose) information of various entities such as the camera, the markers for tracking, and the various objects.

After successful calibration of the optical-see-through augmented reality system for the individual user, the system can render 3D graphical objects in a way that they appear rigidly anchored in the real scene. The user's viewpoint changes are tracked with a tracking system and accounted for with corresponding changes of the graphics objects' virtual view.

Alternatively to the case of a head-mounted tracking camera, external tracking means can be used in conjunction with head-mounted markers or sensors that are rigidly fixed with respect to the illuminator. The tracking system tracks both the HMD and the calibration screen 401. Again, the 3D coordinates of the calibration light points can be aligned 402 and determined as intersection of light beams and screen plane 403. The virtual reference points are brought into alignment with the real reference points displayed as light on the screen and the correspondence is recorded 404.

System includes head-mounted display, tracking means, computing and graphics rendering means, light projection means, and trackable screen.

Calibration alignments between the real and virtual reference structures may be averaged over several measurements for each point correspondence. Note that virtual marker and real marker appear jitter free relative to each other. Averaging may reduce error in the calibration. Averaging is user-friendly compared to calibration procedures that use external features. Here, the user can hold the alignment for one or several seconds because of the reduced jitter between the real and virtual markers.

Having described embodiments for a system and method for calibrating real and virtual views, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. An augmented reality system comprising:
   a real reference generator for displaying a real reference on a calibration screen;

an optical see-through display having a fixed position with respect to the real reference generator;

a virtual reference generator for displaying a virtual reference on the optical see-through display;

an input device for aligning a view of the virtual reference with a view of the real reference through the optical see-through display, wherein the virtual reference is moved on the optical see-through display to be aligned with the view of the real reference; and a processor for determining one or more parameters for rendering a virtual object as part of a real scene seen through the optical see-through display.

2. The augmented reality system of claim 1, further comprising a tracking camera for tracking a pose of the calibration screen with respect to the real reference.

3. The augmented reality system of claim 1, further comprising a tracking camera having a fixed position with respect to the real reference generator for capturing a view of the calibration screen.

4. The augmented reality system of claim 3, further comprising a processor, wherein an optical marker configuration is fixed to the calibration screen and imaged by the tracking camera, wherein the processor determines a positional relationship between the calibration screen and a head-mounted display according to a position of the optical marker configuration in an image captured by the tracking camera, the head-mounted display comprising the real reference generator and optical see-through display.

5. The augmented reality system of claim 1, further comprising at least one tracking camera for capturing a view of the calibration screen and a head-mounted display comprising the real reference generator and optical see-through display.

6. The augmented reality system of claim 5, further comprising a processor, wherein an optical marker configuration is fixed to each of the calibration screen and the head-mounted display and tracked by the at least one tracking camera, wherein the processor determines a positional relationship between the calibration screen and the head-mounted display according to the positions of respective optical marker configurations in the view captured by the at least one tracking camera.

7. A system for calibrating real and virtual views comprising:

a real reference generator for displaying a real reference on a calibration screen;

an optical display having a fixed position with respect to the real reference generator;

a virtual reference generator for generating a virtual reference in the optical display, wherein the virtual reference is independently movable with respect to the real reference;

an input device for aligning a view of the virtual reference with a view of the real reference, wherein the virtual reference is moved on the optical display with respect to the view of the real reference; and a processor for determining one or more parameters for rendering a virtual object in a real scene seen in the optical display.

8. The system for calibrating real and virtual views claim 7, further comprising a camera capturing the view of the real reference, wherein the real reference is displayed in the optical display with the virtual reference superimposed thereon.

9. The system for calibrating real and virtual views claim 8, further comprising;

a tracking camera having a fixed position with respect to the real reference generator for capturing a view of the calibration screen; and a processor, wherein an optical marker configuration is fixed to the calibration screen and tracked by the tracking camera, wherein the processor determines a positional relationship between the calibration screen and a head-mounted display according to the position of the optical marker configuration in the view captured by the tracking camera, the head-mounted display comprising the real reference generator and optical display.

10. The system for calibrating real and virtual views claim 7, further comprising a tracking camera coupled to the real reference generator for capturing a view of the calibration screen.

11. The system for calibrating real and virtual views claim 10, further comprising a processor, wherein an optical marker configuration is fixed to the calibration screen and tracked by the tracking camera, wherein the processor determines a positional relationship between the calibration screen and a head-mounted display according to the position of the optical marker configuration in the view captured by the tracking camera, the head-mounted display comprising the real reference generator and optical display.

12. The system for calibrating real and virtual views claim 7, further comprising a at least one tracking camera for capturing a view of the calibration screen and a head-mounted display comprising the real reference generator and optical display.

13. The system for calibrating real and virtual views claim 12, further comprising a processor, wherein an optical marker configuration is fixed to each of the calibration screen and the head-mounted display and tracked by the tracking camera, wherein the processor determines a positional relationship between the calibration screen and the head-mounted display according to the positions of respective optical marker configurations in the view captured by the at least one tracking camera.

14. A method for calibrating real and virtual views comprising:

tracking a calibration screen, wherein a real reference, generated by a real reference generator, is projected on the calibration screen;

aligning a virtual reference to a view of the real reference in a display, the virtual reference being independently movable with respect to the real reference, wherein the real reference generator and the display have a fixed relative position;

determining a point correspondence between the virtual reference and the real reference; and determining one or more parameters for rendering a virtual object in the real scene.

15. The method for calibrating real and virtual views of claim 14, further comprising displaying the virtual reference on an optical see-through display, through which the real reference is visible.

16. The method for calibrating real and virtual views of claim 14, further comprising:

capturing a view of a real scene including the real reference; and displaying the view of the real scene augmented with the virtual reference.

* * * * *

UNITED STATES PATENT AND TRADEMARK OFFICE
CERTIFICATE OF CORRECTION

| | | |
|---|---|---|
| PATENT NO. | : 7,369,101 B2 | Page 1 of 1 |
| APPLICATION NO. | : 10/863414 | |
| DATED | : May 6, 2008 | |
| INVENTOR(S) | : Frank Sauer, Yakup Genc and Nassir Navab | |

It is certified that error appears in the above-identified patent and that said Letters Patent is hereby corrected as shown below:

Col. 1; line 3;
Please insert the following at page 1, after the Title of the Invention:

--CROSS-REFERENCE TO RELATED APPLICATION

This application claims the benefit of Provisional Application 60/477,861, filed June 12, 2003.--

Signed and Sealed this

Sixth Day of January, 2009

JON W. DUDAS
*Director of the United States Patent and Trademark Office*